Nov. 4, 1958    S. MEURER    2,858,814
FUEL INJECTION ENGINE
Filed July 29, 1957    2 Sheets-Sheet 1

INVENTOR
Siegfried Meurer

BY Bailey, Stephens & Huettig
ATTORNEYS

United States Patent Office 2,858,814
Patented Nov. 4, 1958

2,858,814

FUEL INJECTION ENGINE

Siegfried Meurer, Nurnberg, Germany, assignor to Maschinenfabrik Augsburg-Nurnberg A. G., Nurnberg, Germany Application July 29, 1957, Serial No. 674,690

12 Claims. (Cl. 123—32)

This invention relates to an internal combustion engine. In particular, the invention is directed to an internal combustion engine in which the air is compressed into a combustion chamber in the piston, the chamber having the form of a body of rotation and which receives substantially all of the air compressed in the cylinder. The fuel injection nozzle is mounted offset from the axis of the cylinder and combustion chamber, with the fuel being placed upon the combustion chamber wall in the form of a film. The fuel is then gradually vaporized from the wall by an air swirl created within the combustion chamber, and the fuel vapors mixed with the air and then burned. This fuel burning system is disclosed in German Patent No. 865,683 and U. S. patent application to Meurer et al. Serial No. 480,432, filed January 7, 1955.

In the operation of this system, the problem exists of atomizing only such a small portion of the injected fuel as is necessary for initiating a self-ignition for the purpose of igniting the mixture of air and vaporized fuel, these particles being essentially in a fluid state. The construction requirements of high speed engines limits the solution to this problem. In order to guide the greatest possible amount of air into the combustion chamber during the compression stroke, the clearance at top dead center between the piston crown and the cylinder head must be kept as small as possible; and while passing through top dead center, the piston has a clearance of only a few tenths of a millimeter from the cylinder head. Consequently, in this small space, the squeezing of the air causes the air to flow with great radial speed toward and into the combustion chamber. In a conventional mounting of the injection nozzle in the cylinder head, the nozzle orifice lies in approximately the same plane as the cylinder head surface, and the fuel jet must then cross the space occupied by the squeezed air stream. Consequently, the air stream can rip open one or more of the fuel jets even though they are solid jets of fuel, and the fuel is therefor atomized. This causes more fuel to be atomized than permissible or desired, with the atomized fuel being mixed with the air and burned with a loud knocking noise. This occurrence is especially severe shortly before the top dead center of the piston at which point the speed of the squeezed air stream is at its maximum at that time, and the point at which the maximum velocity of the air is reached is in the vicinity of the outer peripheral edge of the combustion chamber.

The object of this invention is to produce a cylinder and piston construction in which the injected fuel is not unduly atomized by the air swirl during fuel injection.

In general, the object is obtained by providing two separate openings in the combustion chamber in the piston. One of these openings which serves substantially for the reception of the air is located in the center of the piston and through which the air flows until the end of the piston compression stroke. The other opening is provided for the fuel injection and is located near the edge of the combustion chamber. This fuel injection opening is screened so that, as the piston approaches top dead center, the air squeezed between the piston crown and cylinder head is prevented from reaching immediately the fuel jet.

Another feature of the invention lies in that both combustion chamber openings are formed in a ring disc which is seated in a corresponding groove on the outer peripheral edge of the combustion chamber in the crown of the piston.

The screen of the fuel path from the squeezed air can be arranged so that the body of the injection nozzle extends partly from the cylinder head towards the combustion chamber so that, at piston top dead center, this extended portion of the nozzle penetrates through the fuel injection opening of the disc. This fuel injection opening has a diameter giving a close clearance with the fuel nozzle portion extending therethrough.

When the fuel injection nozzle is mounted, because of thermal or other reasons, so that it does not extend into the combustion chamber, and the nozzle orifice is at the same height as the cylinder head surface, it is desirable to mount a tubular guide sleeve surrounding the nozzle orifice and serving as an extension of the nozzle bore. This tubular guide sleeve is therefor an extension serving as the extension of the nozzle body portion into the combustion chamber through the fuel injection opening of the ring disc at the top dead center position of the piston. This tubular guide sleeve surrounds the path of the fuel jets coming from the nozzle and protects them from the squeezed swirling air in the space between the piston and the cylinder head.

If the hollowed space in the piston head forming the combustion chamber is provided with a groove in a known manner, the ring-shaped disc on the upper edge of the chamber is positioned so that the fuel injection opening lies directly above the groove. The center air opening of the disc is usually located concentric with the axis of the combustion chamber.

The invention can also be applied to combustion chambers having a constricted portion, such as shown, for example, in Meurer Patent No. 2,762,348, as will be hereinafter described.

In all forms of the invention, the fuel injection opening is radially offset outwardly from the central air-gas opening so that the fuel is injected at a sharp angle in order to reach the combustion chamber wall approximately tangentially. The diameter of the large air-gas opening is about ten times the diameter of the small fuel injection opening.

The means by which the object of the invention is obtained are described more fully with reference to the accompanying drawings, in which.

Similar reference characters are used for similar elements in all of the figures.

Figure 1:
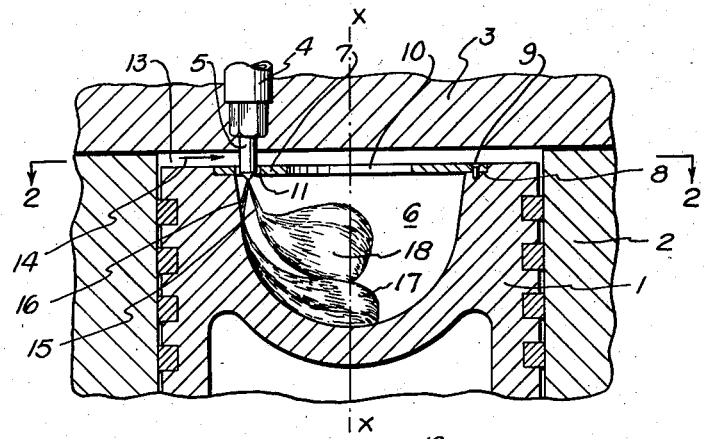
Figure 1 is a cross-sectional view on the line 1—1 of Figure 2.
Figure 2:
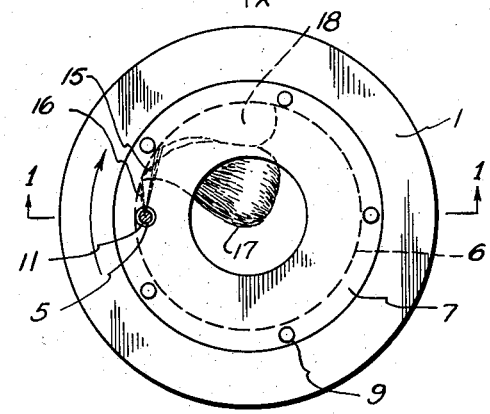
Figure 2 is a cross-sectional view on the line 2—2 of Figure 1.
Figure 4:
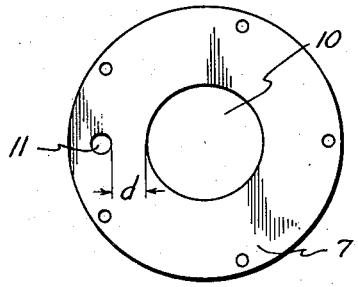
Figure 4 is a plan view of Figure 3.

The piston 1 is mounted in a cylinder 2 covered by a cylinder head 3. The fuel injection body 4 has a nozzle 5. In Figures 1 and 2, a combustion chamber 6 is located in the piston head and has, for example, a semi-spherical or semi-elliptical shape. The outer upper peripheral edge of chamber 4 is covered by a ring disc 7 which is seated in a complementary recess 8 and secured as by screws 9. Other means can be used for securing disc 7, or the disc 7 can be formed integral in a one-piece construction with piston 1. When produced separately, disc 7 is preferably composed of a metal having a higher temperature stability than the material of the piston 1, as, for example, of austenitic steel. Ring disc 7 has a relatively large central opening 10 which has a diameter approximately that of a throttle-free combustion chamber. A second small opening 11 extends through ring disc 7. This second opening is outwardly offset from the central opening 10 by the radial distance d. The position of opening 11 is such as to screen the injected fuel from the squeezed air swirl. The diameters of the two openings 10 and 11, respectively, are in the proportion of 10 to 1.

Figure 3:
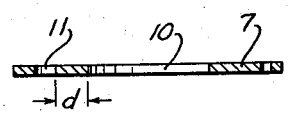
Figure 3 is a cross-sectional view through the ring disc.
Figure 3A:
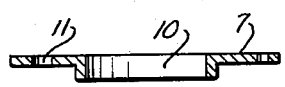
Figure 3a is a cross-sectional view through a modified form of ring disc.

As shown in Figure 3a, in particular cases, the disc 7 can be provided with a cylindrical sleeve 7a which extends toward the interior of the combustion chamber 6, and thus limits the entrance of air through opening 10 into the combustion chamber.

When ring disc 7 is seated in recess 8, opening 10 is approximately concentric with the axis x—x of combustion chamber 6; small opening 11 is immediately adjacent to the edge of the combustion chamber. This outer peripheral edge can be provided on one side with a groove 12, as disclosed in Figures 5 and 6, which groove is gradually faired into the wall of chamber 6. Ring disc 7 is then arranged so that it covers groove 12, and opening 11 lies directly above the groove. The combustion chamber is thus provided with two openings, a large central opening exclusively for the passage of air and gas and a small opening for purposes of fuel injection.

To protect the path of the fuel jet from the air squeezed in the space 13 between the piston and cylinder head and moving in the direction of arrows 14 as the piston approaches top dead center, the ring disc 7 can be used as follows.

As shown in Figures 1 and 2, the fuel injection nozzle 5 is of such length that it extends through an enclosed opening 11 into chamber 6 as the piston approaches top dead center and before the fuel is injected. Opening 11 has such a close clearance with nozzle 5 that the opening, in effect, forms a guide for the nozzle. Thus the fuel emitted from the nozzle in the form of jets 15 and 16 is protected against disturbance by the squeezed air moving in the direction of arrows 14. Therefore, the fuel can reach the combustion chamber wall without danger of being atomized in a solid closed stream with the full kinetic energy given by the injected pressure and thus form films 17 and 18 on the combustion chamber wall. The removal of these films 17 and 18 from the wall in the form of vapors can be accomplished only by the air which has entered opening 10 in a pre-determined direction which was accomplished by the pre-rotation of the air by such known means as a masked intake valve or a spiral-shaped intake duct (not shown).

In prior constructions, it has been suggested that the nozzle 5 could be extended so that the outlet orifice would be positioned below the outer peripheral edge of the combustion chamber during the time the fuel was injected, but this was done heretofore by injecting the fuel through an open groove in the edge of the combustion chamber, the opening of the groove not being separated from the opening in the combustion chamber. This had the disadvantage in that the combustion air being compressed plunges over the outer peripheral edge of the combustion chamber into the chamber and creates an air turbulence in the vicinity of the fuel jets, which is not desired in an engine according to this invention.

Therefore, this invention uses the ring disc to protect the fuel jets from the edge produced air turbulence. The fuel jets immediately after emerging from the nozzle orifice reach the wall of the combustion chamber without interference from the squeezed air in the space 13. The fuel, therefore, has the opportunity of being deposited in the form of a film over the greatest possible surface of the combustion chamber wall.

Figure 5:
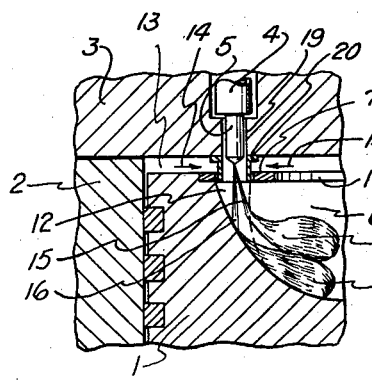
Figure 5 is a partial cross-sectional view through a further form of the invention.
Figure 6:
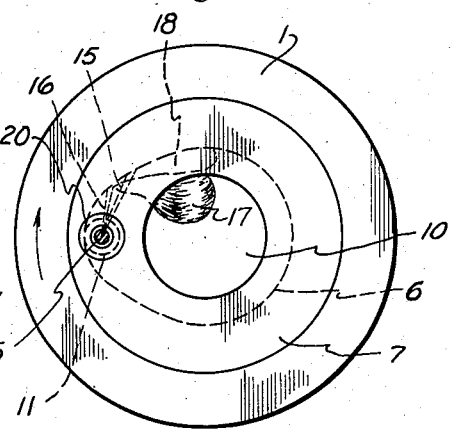
Figure 6 is a plan view of the construction of Figure 5.

Figure 5, in addition to the groove 12, also discloses a further form of the invention. This form is preferred if nozzle 5 is not extended until it reaches the combustion chamber because of thermal or other reasons, but the outlet orifice lies approximately in the plane of the cylinder head surface. In this case, a tubular sleeve guide housing 20 is mounted on cylinder head 3 and serves as an extension of the bore 19 containing the nozzle body 4 and nozzle 5 in a direction toward the combustion chamber. This sleeve 20 can be in the form of a cylindrical flanged body and is mounted so that it extends through the small opening 11 of the ring disc 7 as the piston approaches top dead center in a manner similar to that described in Figures 1 and 2. Thus sleeve 20 serves to protect the fuel jet from the squeezed air moving in the direction of arrows 14.

Figure 7:
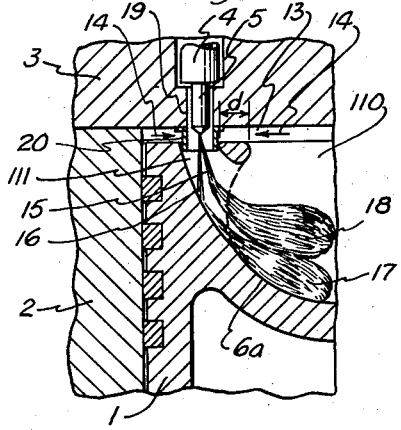
Figures 7 and 8 are cross-sectional views, respectively, of two further modifications of the invention.
Figure 8:
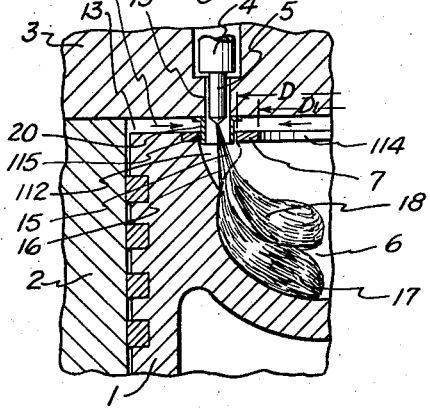

In Figures 7 and 8, the combustion chamber has a constricted portion beneath the outer peripheral edge, as shown, for example, in Patent No. 2,762,348. In Figure 7, the constricted portion 110 can serve simultaneously as the large opening in the combustion chamber for the air and gas and a shoulder containing a bore 111 offset from the outer peripheral edge of the large opening by the radial distance d, which small opening constitutes the fuel injection opening. Bore 111 preferably is enlarged conically toward the interior of chamber 6 and gradually faired into combustion chamber wall 6a. The fuel jets 15 and 16 are again protected against the squeezed air in the same manner as in Figure 5, the only difference being that the tubular sleeve 20 passes through the opening into bore 111 near top dead center. This construction could likewise be according to Figures 1 and 2 whereby the nozzle body 5 would extend through the opening into bore 111. As shown in Figure 7, the shoulder 113 integral with the piston serves to separate opening 110 from the opening into bore 111.

In Figure 8, ring disc 7 is shown fitted to a combustion chamber having a constricted portion when the upper portion contains a groove 112. Groove 112 is covered by disc 7 having large opening 114 and small opening 115, with the small opening lying directly over groove 112. The fuel jets 15 and 16 are protected in the same manner as in Figures 1, 5 and 7. Large center opening 114 can be given a diameter such that it further constricts the most narrow portion of the combustion chamber from diameter D to a diameter $D_1$. Consequently, the air turbulence formed over the edge of opening 114 is kept from reaching the fuel jets, and the the removal of the fuel vaporized from the combustion chamber is accomplished exclusively by the air rotating in the combustion chamber.

Having now described the means by which the object of the invention is obtained,

I claim:

1. In an internal combustion engine having a cylinder, a fuel injection nozzle offset from the axis of said cylinder, a piston in said cylinder having a combustion chamber in the piston head adapted to receive substantially all of the air in said cylinder at the end of the compression stroke, said nozzle having an outlet orifice oriented to direct a fuel jet over a short path tangentially against the wall of said chamber as a film adapted to be vaporized by the air swirling in the chamber, the improvement comprising a combustion chamber having a large opening for receiving the air during the compression stroke, and an enclosed small opening aligned with said injection nozzle through which the fuel is jetted into said chamber while protected from the air being compressed in the cylinder through said large opening adjacent the end of the compression stroke.

2. An engine as in claim 1, further comprising a ring disc seated on the outer peripheral edge of said chamber, and both said small and large openings being in said disc.

3. An engine as in claim 1, said nozzle extending into said cylinder a distance such that it passes through said small opening adjacent the end of the compression stroke.

4. An engine as in claim 1, further comprising a cylinder head having the nozzle mounted therein with the outlet orifice of said nozzle lying substantially in the plane of the surface of said cylinder head, and a tubular sleeve guide secured to said cylinder head around the outlet orifice of said nozzle and extending through said small opening adjacent the end of the compression stroke.

5. An engine as in claim 1, said combustion chamber having a groove therein, and a ring disc seated on the outer peripheral edge of said chamber and covering said groove with said small opening lying directly above and communicating with said groove, and said large opening being concentric with the cylinder axis.

6. An engine as in claim 1, said small opening comprising a bore extending from the surface of the piston head into said chamber, said bore being gradually enlarged toward said chamber and being faired into the wall of said chamber.

7. An engine as in claim 1, said chamber having a constricted portion, a groove extending from the surface of said piston through said constricted portion and into said chamber, a ring disc seated around the outer peripheral edge of said chamber and covering said groove, said small opening lying directly above and communicating with said groove, and said constricted portion being concentric with said large opening.

8. An engine as in claim 1, said small opening being radially offset from said large opening to permit the fuel jet to enter the combustion chamber at a sharp angle with relation to the combustion chamber wall and to strike said wall substantially tangentially.

9. An engine as in claim 1, said large and small openings having diameters in the proportion of 10:1.

10. An engine as in claim 1, a ring disc integral with said piston and surrounding the outer peripheral edge of said chamber, and said small opening being in said disc.

11. An engine as in claim 1, further comprising a ring disc of austenitic steel seated on the outer peripheral edge of said chamber, and said small opening being in said disc.

12. An engine as in claim 11, further comprising a cylindical sleeve surrounding said large opening and extending toward the interior of said chamber.

References Cited in the file of this patent

UNITED STATES PATENTS 2,777,430     Muerer _____ Jan. 15, 1957